United States Patent [19]  [11] 3,926,964
Liechti [45] Dec. 16, 1975

[54] NEW OXAZOLE COMPOUNDS, PROCESS FOR THEIR MANUFACTURE, AND THEIR USE AS OPTICAL BRIGHTENERS FOR ORGANIC MATERIALS

[75] Inventor: Peter Liechti, Arisdorf, Switzerland
[73] Assignee: Ciba-Geigy AG, Basel, Switzerland
[22] Filed: July 30, 1973
[21] Appl. No.: 383,737

[52] U.S. Cl. ..... 260/240 CA; 117/33.5 T; 162/162; 252/301.2 W; 252/301.3 W; 252/543
[51] Int. Cl.² .................................. C07D 263/56
[58] Field of Search ..................... 260/240 CA

[56] References Cited
UNITED STATES PATENTS
3,429,877 2/1969 Maeder et al. ............ 260/240 CA
3,577,411 5/1971 Liechti et al. .............. 260/240 CA Primary Examiner—Arthur P. Demers
Attorney, Agent, or Firm—Joseph G. Kolodny; Edward McC. Roberts; Prabodh I. Almaula

[57] ABSTRACT

The invention relates to new oxazole compounds of the formula

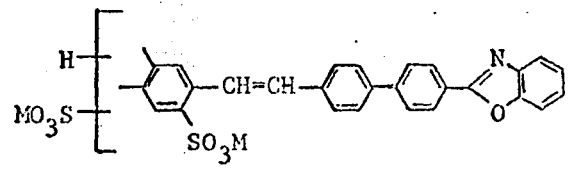

wherein M represents hydrogen or a salt-forming cation. The new compounds are useful optical brighteners, especially for cotton fabrics and paper.

2 Claims, No Drawings

NEW OXAZOLE COMPOUNDS, PROCESS FOR THEIR MANUFACTURE, AND THEIR USE AS OPTICAL BRIGHTENERS FOR ORGANIC MATERIALS

The present invention relates to new benzoxazolyl-stilbene derivatives, a process for their manufacture, and their use as optical brighteners for organic materials.

It is already known that benzoxazolylstilbene compounds of the formula

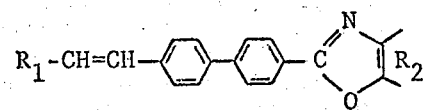

wherein $R_1$ represents a benzene radical and $R_2$ represents a benzene or naphthalene radical which is condensed with the oxazole ring in the manner indicated by the valency lines, are useful as optical brighteners for organic materials.

The invention is based on the observation that selected compounds within the definition given hereinbefore possess unexpected advantages. They brighten cotton even from cold baths with striking effects without thereby soiling the attendant fibres in fabric blends; they are resistant to hypochlorite and impart a pleasing appearance to washing powders; they are excellently suitable for brightening paper.

These selected compounds correspond to the formula (1)

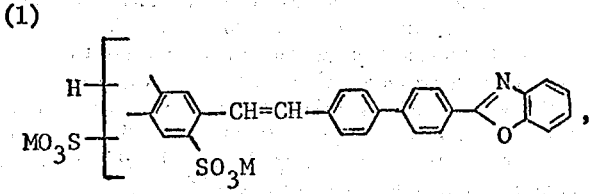

wherein M represents hydrogen or a salt-forming cation. The nature of the salt-forming cation has scarcely any effect on the fluorescent behaviour of the primary compound. For practical reasons, however, particular interest attaches to sodium, potassium and ammonium or amine salts.

The preferred compound is that of the formula (2)

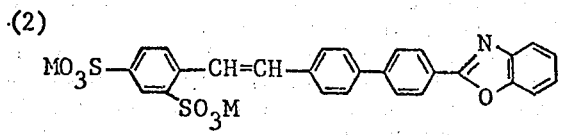

wherein M has the given meaning.

The compounds of the formula (1) and of the formula (2) can be manufactured analogously to known processes.

Such a process consists, for example, in reacting one mole of a compound of the formula (3) 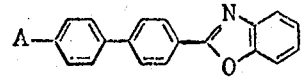

wherein A represents a group of the formula

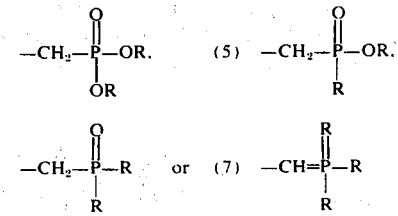

wherein R represents an optionally further substituted alkyl radical, preferably one with 1 to 6 carbon atoms, an aryl radical, preferably a phenyl radical, a cycloalkyl radical, preferably a cyclohexyl radical, or an aralkyl radical, preferably a benzyl radical, with one mole of an aldehyde of the formula (8) 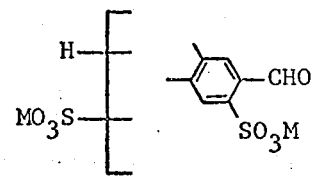

wherein M has the given meaning. The manufacturing process is advantageously carried out in inert solvents. As examples thereof there may be cited: hydrocarbons, for example toluene and xylene, or alcohols such as methanol, ethanol, isopropanol, butanol, glycols, glycol ethers, for example 2-methoxyethanol, hexanols, cyclohexanol and cyclooctanol, also ethers, for example diisopropyl ether, tetrahydrofuran, and dioxan, as well as dimethyl sulphoxide, formamide, and N-methylpyrrolidone. Polar organic solvents such as dimethyl formamide and dimethyl sulphoxide are particularly suitable. It is also possible to carry out some of the reactions in aqueous solution.

The temperature at which the reaction is carried out can vary within wide limits. It is determined α. by the stability of the solvent used towards the reactants, especially towards the strongly basic alkali compounds, β. by the reactivity of the condensation partners, and γ. by the effectiveness of the combination of solvent and base as condensation agent.

In practice, accordingly, temperatures between about 10° and 100°C are suitable as a general rule, particularly if dimethyl formamide or dimethyl sulphoxide are used as solvents. The preferred temperature range is 20° to 60°C. However, the use of higher temperatures is also possible if this is desired for time saving reasons or if a less active but cheaper condensation agent is to be used. In principle, therefore, reaction temperatures in the range of 10° to 180°C are also possible.

Suitable strongly basic alkali compounds are chiefly the hydroxides, amides, and alcoholates (preferably those of primary alcohols containing from 1 to 4 carbons) of the alkali metals, those of lithium, sodium, and potassium being of primary interest for economic reasons. But in principle and in particular cases it is also possible to use with success alkali sulphides and alkali carbonates, arylalkali compounds, for example phenyllithium or strongly basic amines (including ammonium bases, e.g. trialkylammonium hydroxides).

The phosphorous compounds of formula (3) required as starting materials are obtained in known manner by reacting halomethyl compounds, preferably chloromethyl or bromomethyl compounds of the formula (9) 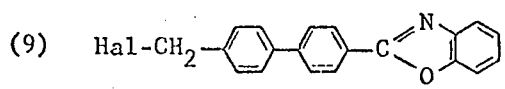

wherein Hal represents chlorine or bromine, with phosphorous compounds of the formulae

(10) RO—P—OR    (11) RO—P—OR
         |                |
         OR               R

(12) R—P—OR     (13) R—P—R
        |               |
        R               R

In the formulae (10) to (13) R has the meaning given hereinbefore and radicals R bonded to oxygen are preferably lower alkyl groups, but radicals R bonded to phosphorus are perferably aryl radicals, for example benzene radicals.

The compounds of the formula (9) are obtained in known manner from the compound of the formula

(14) 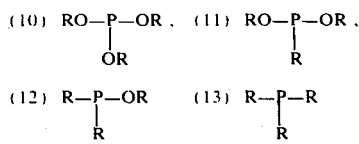

for example by bromination using bromosuccinimide or by chlorination with chlorine, the halogenation being catalysed by light of short wavelengths.

One process for the manufacture of the compound of the formula (14) consists for example in reacting carboxylic acids or carboxylic acid derivatives of the formula

(15) 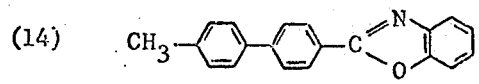

wherein X represents a hydroxyl group, an alkoxy group with 1 to 4 carbon atoms, or a halogen atom, in particular a chlorine atom, with o-aminophenol, in which case it is also possible optionally to obtain as intermediate stage the compound of the formula

(16) 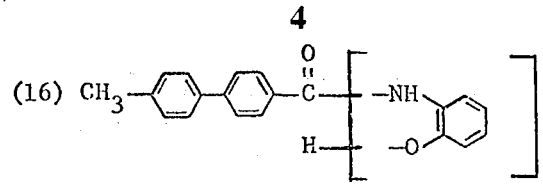

The reaction of the respective components of the formula (15) and o-aminophenol can take place, with or without intermediate separation of the initially resulting intermediate stage of the formula (16), by heating to more elevated temperatures, for example to 120° to 350°C, advantageously in an inert gas, e.g. a flow of nitrogen, the reaction optionally being carried out in the presence of a catalyst. Suitable catalysts are, for example, boric acid, boric anhydride, zinc chloride, p-toluenesulphonic acid, also polyphosphoric acids including pyrophosphoric acid. Where the catalyst is boric acid the amount in which it is used is advantageously from 0.5 to 5%, relative to the total weight of the reaction mass. The conjoint use of high boiling, polar organic solvents is also possible, for example dimethyl formamide, dichlorobenzene, trichlorobenzene, and aliphatic, optionally etherified oxy compounds, e.g. propylene glycol, ethylene glycol monoethyl ether or diethylene glycol diethyl ether, and high boiling esters of phthalic acid, e.g. dibutyl phthalate.

In the two-stage performance of the process it is possible to condense first the carboxylic acid halide of the formula (15) with the o-aminophenol in the presence of an inert organic solvent, e.g. toluene, xylene, chlorobenzene, dichlorobenzene, trichlorobenzene or nitrobenzene, at a temperature between 100° and 200°C, and to convert the resulting acyl compound of the formula (16) at a temperature between 150° and 350°C, optionally in the presence of a catalyst, into the oxazole compound of the formula (14). If the carboxylic acid chloride is used as starting material, this can be manufactured immediately before the condensation with the o-amino compound from the free carboxylic acid and thionyl chloride, optionally with the addition of a catalyst, e.g. pyridine, to the solvent in which the condensation is afterwards carried out.

Compounds of the formula (15) are obtained for example by reduction of the compound of the formula

(17) 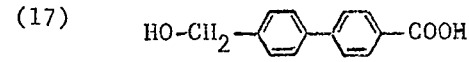

with hydrogen/palladium. The compound obtained in this manner of the formula

(18) 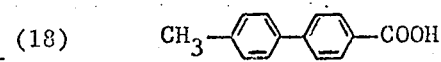

is optionally converted by known methods into the corresponding acid chlorides or esters. The aldehydes of the formula (8) are known.

Another process for the manufacture of compounds of the formula (1) and of the subsidiary formula (2) consists in reacting one of the compounds of the formula

(19) 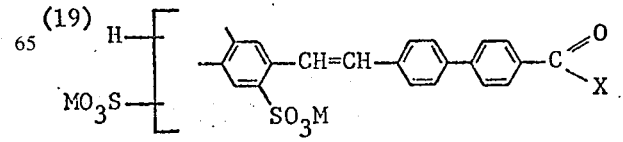

with o-aminophenol, with M having the meaning given hereinbefore and the reaction conditions cited hereinbefore for the manufacture of compounds of the formula (14) from compounds of the formula (15) and aminophenol being applicable.

The compounds of the formula (19) can in turn be manufactured by methods analogous to known ones.

For example, a compound of the formula

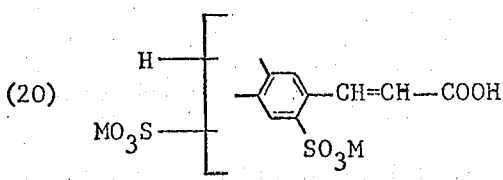

(20)

in which M has the given meaning, is arylated using the diazonium salt of the amine of the formula

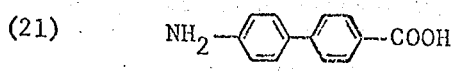

(21)

whereby the carboxyl group at the ethylene bond is simultaneously or subsequently split off.

This "Meerwein arylation" is carried out as a rule in aqueous or aqueous-organic phase, e.g. water-acetone, watermethanol, water-ethanol etc., at temperatures from −10° to +60°C, preferably at 20° to 40°C and in the presence of copper salts, optionally in the presence of a buffer which acts in an acid range, e.g. acetic acid/sodium acetate, monosodium phosphate, monosodium tartrate etc.

The compounds of the formula (20) are manufactured in known manner from the compounds of the formula (8). For example, they are obtained by reaction of a compound of the formula (8) with malonic acid.

The compounds of the formula (19) can also be manufactured by reaction of a compound of the formula (8) with a compound of the formula

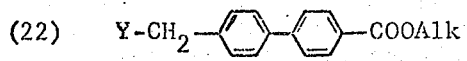

(22)

wherein Y, for example, represents carboxy or —PO(OAlk)$_2$ and Alk represents alkyl with 1 to 4 carbon atoms.

The new optical brighteners, which in the form of their sodium or potassium salts are colourless to slightly yellowish powders; are so readily soluble in water that it is possible to prepare 10–25% liquid preparations, a fact that is greatly appreciated by the consumers.

The compounds according to the invention are suitable for the optical brightening of high molecular organic materials, preferably of cellulose and natural or synthetic polyamides.

The high molecular organic material is optically brightened, for example, by incorporating therein small amounts of optical brighteners according to the invention, e.g. 0.001 to 1%, preferably 0.01 to 0.3%, based on the weight of the material to be brightened, optionally together with other substances, for example plasticisers, pigments etc. Depending on the nature of the material to be brightened, this is done by dissolving the brightener in the monomers before the polymerisation, in the polymer composition, or together with the polymer in the solvent. The material pretreated in this way is then brought into the desired final form by known methods, e.g. calendering, extruding, carding, moulding, or injection moulding.

In general, however, high molecular material in the form of fibres is brightened. This fibre material is brightened by using advantageously an aqueous solution of compounds according to the invention of the formula (1), which preferably has a content of 0.001 to 0.2% of stilbene derivative according to the invention, based on the weight of the fibre material. In addition, the solution can contain adjuvants, for example dispersing agents, e.g. condensation products of fatty alcohols containing 10 to 18 carbon atoms with 15 to 25 moles of ethylene oxide, or condensation products of alkylmono- or polyamines containing 16 to 18 carbon atoms with at least 10 moles of ethylene oxide, and optionally also acids, especially organic acids, for example acetic, oxalic and, preferably, formic acid. The brightening of the fibre material with the aqueous optical brightener solution is accomplished either by the exhaustion method at temperatures of preferably 20° to 100°C, or by the padding or thermopad method.

In the thermopad method, the fibre material is subjected to a dry heat treatment after it has been impregnated. As a rule it is advisable to dry the fibre material previously at moderately elevated temperature, e.g. at 60° to 120°. The heat treatment in the dry state is then effected advantageously at temperatures between 180° and 220°C, for example by heating in a drying cabinet, by ironing, or by treatment with dry, superheated steam.

The compounds according to the invention, in particular those of the formula (2), can be used especially as brighteners for detergents, e.g. for soaps, soluble salts of higher fatty alcohol sulphates, higher arylsulphonic acids and/or arylsulphonic acids which are polysubstituted with alkyl, sulphoncarboxylic acid esters of medium to higher alkanols, higher alkanoylaminoalkylcarboxylic or -sulphonic acids or alkanoylaminoarylcaroxylic or -sulphonic acids, or of fatty acid glycerol sulphates; also non-ionic detergents, e.g. higher alkylphenol polyglycol ethers.

Detergents according to the invention can contain the conventional fillers and adjuvants, e.g. alkali polyphosphates and polymetaphosphates, alkali silicates, alkali borates, alkali salts of carboxymethylcelluloses, foam stabilizers, e.g. alkanolamides of higher fatty acids or complexones, e.g. soluble salts of ethylenediaminetetraacetic acid.

The new stilbene derivatives are incorporated in the detergents or wash liquors advantageously in the form of their solutions in water or in neutral, water-miscible and/or readily volatile, organic solvents, for example lower alkanols or lower alkoxyalkanols. But it is also possible to use them in finely divided, solid form by themselves or in admixture with dispersing agents. For example it is possible to mix, knead, or grind them with the active detergents and then to admix the conventional fillers and adjuvants. The optical brighteners are stirred, for example, with the active detergents, conventional adjuvants, and fillers and water to a slurry, and this is then sprayed in a spray drier. The new stilbene derivatives can also be admixed with finished detergents, for example by spraying a solution in a readily volatile and/or water-soluble organic solvent on the dry, agitated detergents.

The content of detergent to optical brighteners of the formula (1) is advantageously 0.001 to 0.5%, based on the solids content of the detergent. Such detergents containing optical brighteners of the formula (1) have a greatly improved white appearance in daylight compared with detergents which contain no optical brighteners.

Wash liquors which contain the compounds according to the invention of the formula (1) impart to the textile fibres treated therewith a brilliant appearance in daylight. They can therefore be used particularly for washing these synthetic fibres, or textiles consisting of such fibres, and components of textiles and household linen. For use in domestic washing they can contain still further optical brighteners with affinity for other fibres.

The new stilbene derivatives of the formula (1), in particular the compound of the formula (23)

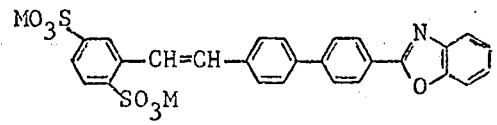

are also suitable for brightening paper.

For the brightening of paper, the compounds according to the invention can be added both to the pulp and with particular advantage — used in the surface finishing.

The term "surface coating treatment" is intended to cover all operations which are concerned with the finishing of crude paper by coating it with a finishing agent.

The surface finishing of paper is generally carried out in actual practice by the following methods:

A. the so-called "starch coating" within the paper machine, e.g. in a sizing press, or
B. the so-called "pigment coating" within or outside the paper machine.

For the starch coating (surface sizing according to A), aqueous size liquors are used which contain as a rule per liter 0.1 to 8 g, e.g. 0.2 to 5 g, of optical brightener of the formula (1), 10 to 200 g/l, e.g. 20 to 150 g/l, preferably 50 to 100 g/l, of bonding agent per liter and optionally a small amount of conventional wetting agents.

For the pigment coating according to B), coating liquors are used as a rule which contain per liter 0.1 to 8 g, e.g. 0.2 to 5 g, of optical brightener of the formula (1), 50–700 g/l, e.g. 350–650 g/l, of white pigment and optionally (based on the weight of the white pigment or pigments used) 8–30% of a binder, 0.2–0.6% of metal binding agents and 0.1 to 0.3% of wetting agent.

Suitable binders are, for example, decomposed starches, alginates, polyvinyl alcohol, polyvinyl pyrrolidone, carboxymethyl cellulose, proteins (e.g. gelatine, casein), aqueous synthetic resin dispersions based on butadiene-styrene or acrylic polymers or copolymers, or mixtures of these binders.

Wetting agents are, for example, unsulphated or sulphated higher alkanol- or alkylphenol polyglycol ethers with an alkyl radical containing from 8–14 carbon atoms and 1–20 ethylene oxide groups.

As white pigments it is possible to use e.g. aluminium magnesium silicates (china clay), calcium carbonate, $CaSO_4 \cdot 1OH_2O$ (satin white), aluminium silicates and hydroxides, barium sulphate (blanc fixe) or titanium dioxide or mixtures of such white pigments. Furthermore, the coating liquors may contain metal binding agents, e.g. water-soluble poly- or metaphosphates + polycarboxylic salts, in order to eliminate undesirable traces of metal (e.g. $Fe^{III}$).

In order to obtain good flow properties it is advantageous to use an alkaline coating liquor for the pigment coating. The alkaline reaction is advantageously adjusted with ammonium hydroxide or with sodium or potassium hydroxides, carbonates or borates or mixtures thereof.

With these coating liquors according to (A) and (B) the paper is advantageously coating in a coating device conventionally used for this purpose. Paper is thereby obtained which display a whiter and more pleasing appearance in addition to an improved surface and printability.

In the surface finishing process the paper is coated in known manner, in the course of which the solutions of fluorescent whitening agents are added to the already prepared size liquors or coating liquors.

As a rule aqueous solutions of fluorescent whitening agents of 0.01–5%, preferably 0.05–2%, are used.

EXAMPLE 1

10.0 g of sodium methylate are added to 21.0 g (0.05 mole) of the phosphonate of the formula (24)

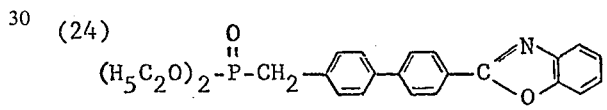

and 18.25 g of the disodium salt of benzaldehyde-2,4-disulphonic acid with a content of 92.7% (corresponding to 0.055 mole) in 400 ml of dimethyl formamide. The mixture turns violet immediately and warms to 41°C. The mixture is stirred for 4 hours at 43° to 45°C in a flow of nitrogen and dissolved in 1600 ml of water. The turbid solution is filtered, treated with 300 ml of concentrated hydrochloric acid, and the suspension is boiled briefly to improve the filtering property, then cooled, and the yellow precipitate is filtered with suction. The product is dissolved in 1400 ml of water. Treatment with activated charcoal and diatomaceous earth and evaporation to dryness yields 21.5 g (app. 80% of theory) of the disulphonic acid of the formula (25)

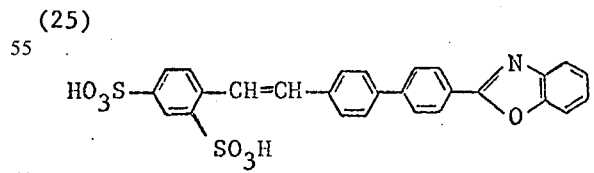

in the form of a greenish yellow powder.

This powder is dissolved in 800 ml of water, the solution brought to pH 8 with normal sodium hydroxide solution, freed from turbidity with diatomaceous earth, and the product is salted out with 150 g of sodium chloride.

The sodium salt of the formula (26)

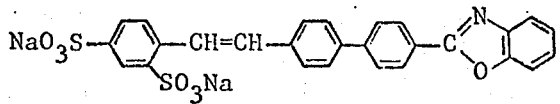

is precipitated in greenish, pale yellow crystals and is filtered with suction, washed, and dried. A sample recrystallised from water yields the following analytical data:

$C_{27}H_{17}O_7NS_2Na_2 \cdot \frac{1}{2} H_2O$: Calculated: C, 55.26; H, 3.09; N, 2.39; S, 10.92. Found: C, 55.25; H, 3.30; N, 2.45; S, 10.80.

By using the sodium salt of benzaldehyde-2,5-disulphonic acid instead of that of benzaldehyde-2,4-disulphonic acid, there is obtained in analogous manner the compound of the formula (27)

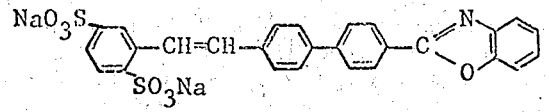

in the form of a pale beige coloured, finely crystalline powder.

$C_{27}H_{17}O_7NS_2Na_2$: Calculated: C, 56.15; H, 2.97; N, 2.43; S, 11.10. Found: C, 55.7; H, 3.5; N, 2.4; S, 10.8.

The phosphonate used as starting material is manufactured as follows:

5020 g (20 moles) of 4,4'-bis-chlorodimethyl-diphenyl are stirred in 35 l of 40% nitric acid for 16 hours at 90° to 95°C. The suspension is filtered after it has cooled, the filter product washed with water, and the beige powder is stirred while still moist in 40 l of water and 6 l of 30% sodium hydroxide solution for 1 hour at reflux temperature. The batch is then filtered through a vacuum filter heated with steam and allowed to cool for several hours. The crystallised crude sodium salt of the formula

(28) NaOOC—⟨⟩—⟨⟩—CH₂OH is filtered with suction (the sodium salt of diphenyl-(4,4'-dicarboxylic acid remains in solution), dissolved in 25 l of hot water, and the solution is strongly acidified with 2 l of concentrated hydrochloric acid. The product is filtered with suction, washed with water, and dried to yield 1600 g of the crude carboxylic acid of the formula

(17) HOOC—⟨⟩—⟨⟩—CH₂OH as a pale beige powder melting at 264° to 268°C. 280 g (1.25 moles) of this crude 4-hydroxymethyl-diphenyl-4'-carboxylic acid are dissolved in 3 l of dimethyl formamide and 300 ml of glacial acetic acid and catalytically hydrogenated with the aid of 30 g of 10% palladium on charcoal at normal pressure and room temperature. The uptake of hydrogen ceases after about 4 hours at about 33 liters (app. 125% of the amount calculated on pure starting material). The catalyst is filtered off, the filtrate concentrated in vacuo to about 400 ml, left to crystallise for about 3 hours, and filtered. The product is washed with carbon tetrachloride and dried to yield 214 g (81% of theory) of the acid of the formula

(18) H₃C—⟨⟩—⟨⟩—COOH in the form of beige crystals which melt at 248° to 253°C. A sample converted into the methyl ester for analysis melts at 118° to 119°C.

$C_{15}H_{14}O_2$: Calculated: C, 79.62; H, 6.24. Found: C, 79.69; H, 6.31.

42.4 g (0.2 mole) of 4-methyl-diphenyl-4'-caroxylic acid and 21.8 g (0.2 mole) of o-aminophenol, in the presence of 1.5 g of boric acid in 80 ml of a mixture of chlorinated diphenols, are heated in a flow of nitrogen within 3 hours from 20° to 212°C, then within about 20 minutes to 300°C. After cooling, filtering with suction, washing the filter product with hexane and drying it, there are obtained 53 g (93% of theory) of the benzoxazole of the formula

(14) H₃C—⟨⟩—⟨⟩—C⟨N/O⟩⟨⟩

Colourless crystals after distillation in a high vacuum; m.p. 160° to 161°C.

$C_{20}H_{15}ON$: Calculated: C, 84.18; H, 5.30; N, 4.91. Found: C, 84.21; H, 5.33; N, 4.87.

48.2 g (0.169 mole) of the compound of the formula (14) and 30.0 g (0.186 mole) of N-bromosuccinimide, in the presence of 1.6 g of dibenzyl peroxide in 1000 ml of carbon tetrachloride, are stirred for 16 hours at reflux temperature while being irradiated with ultraviolet light. After cooling, filtering with suction, washing the filter product with hexane and drying it there are obtained 84.6 g of pale yellow product. This product is freed from resulting succinimide by suspending it 3 times in 2000 ml of water on each occasion and dried in vacuo at 80°C. The yield consists of 59.8 g of the crude compound of the formula

(29) Br-CH₂—⟨⟩—⟨⟩—C⟨N/O⟩⟨⟩ in the form of beige coloured crystals with a melting point of 178° to 180°C. Purification of this sparingly soluble yet sensitive compound is dispensed with.

58 g of the crude bromide of the formula (29) and 32 ml of triethyl phosphite are stirred for 1 hour at 152° to 155°C while distilling of 16.2 g of ethyl bromide. After the mixture has cooled it is diluted with 150 ml of hexane, filtered with suction, and the filter product is washed with hexane and dried in vacuo at 80°C to give 58.9 g of the crude phosphonate of the formula

(30) $H_5C_2O)_2$-P(=O)-CH₂—⟨⟩—⟨⟩—C⟨N/O⟩⟨⟩ with a melting pount of 136° to 138°C. Recrystallization from carbon tetrachloride yields almost yellow crystals which melt at 147° to 149°C.

$C_{24}H_{24}O_4NP$: Calculated: C, 68.40; H, 5.74; N, 3.32; P, 7.35. Found: C, 68.23; H, 5.67; N, 3.57; P, 7.26.

EXAMPLE 2

Bleached cotton fabric is washed for 30 minutes in a liquor heated to 60°C (liquor ratio 1:30) and containing the following additives per liter:
- 0.032 g of the optical brightener of the formula (26) or (27)
- 1 g of active chlorine (bleach solution)
- 4 g of a washing powder of the following composition:
    - 15.00% of dodecylbenzenesulphonate
    - 10.00% of sodium laurylsulphonate
    - 40.00% of sodium tripolyphosphate
    - 25.75% of anhydrous sodium sulphate
    - 7.00% of sodium metasilicate
    - 2.00% of carboxymethylcellulose and
    - 0.25% of ethylenediaminetetraacetic acid.

After it has been rinsed and dried the fabric shows a strong brightening effect of good fastness to acid and to chlorine. The washing powder of the above composition can also contain the brightener of the formula (26) or (27) directly incorporated in it. A strong brightening effect is also obtained by carrying out the washing procedure over 30 minutes at 20°C.

EXAMPLE 3

Bleached cotton fabric is washed for 30 minutes at 60° to 95°C in a liquor ratio of 1:20. The wash liquor contains the following additives per liter:
- 0.04 g of the optical brightener of the formula (26)
- 4 g of a washing powder of the following composition:
    - 40.0% of soap flakes
    - 15.0% of sodium tripolyphosphate
    - 8.0% of sodium perborate
    - 1.0% of magnesium silicate
    - 11.0% of sodium metasilicate (9 $H_2O$)
    - 24.6% of calcined sodium carbonate
    - 0.4% of ethylenediaminetetraacetic acid.

After it has been rinsed and dried the cotton fabric shows a strong brightening effect.

EXAMPLE 4

Boiled cotton fabric is treated for 60 minutes at room temperature in a liquor ratio of 1:30 in a bath of the following composition:
- 0.1% of the optical brightener of the formulae (26) or (27), based on the weight of the fibre
- 2 g/l of activated chlorine in the form of a bleach solution (javel water)

The fabric is thereafter rinsed and dechlorinated. After it has been rinsed and dried the fabric displays a very strong brightening effect.

EXAMPLE 5

A polyamide fibre fabric (Perlon) is put at 60°C in the liquor ratio of 1:40 into a batch containing (based on the weight of the fabric) 0.1% of one of the brighteners of the formulae (26) or (27) as well as per liter 1 g of 80% acetic acid and 0.25 g of an adduct of 30 to 35 moles of ethylene oxide with 1 mole of commercial stearyl alcohol. The batch is heated within 30 minutes to boiling temperature and kept for 30 minutes at the boil. After rinsing and drying the fabric a strong brightening effect of good fastness to light is obtained. Similarly good brightening effects are obtained by using a fabric made from polyamide 66 (nylon) instead of from polyamide 6. Finally, it is also possible to carry out the process under HT conditions, e.g. for 30 minutes at 130°C. For this kind of application it is advisable to add 3 g/l of hydrosulphite to the solution.

EXAMPLE 6

In a hollander, 2 parts of resin size are added to a paper pulp which contains 100 parts of bleached cellulose. After 10 to 15 minutes there is first added 0.05 to 0.3 part of one of the compounds of the formulae (26) or (27) which have been dissolved in 20 parts of water, and then, after a further 15 minutes, 3 parts of aluminium sulphate are added. The treated pulp is the conveyed via the mixing tank to the paper machine in which the paper is manufactured in known manner. The resulting paper displays an outstanding brigthening effect of good fastness to light.

EXAMPLE 7

In a hollander, 2 parts of resin size are added to a paper pulp which contains 100 parts of bleached cellulose. After 15 minutes 3 parts of aluminium sulphate are added. The paper web manufactured in the paper machine is then sized on the surface with a size press, using as adhesive starch or alginates which contain 0.05 to 0.3 part of one of the compounds of the formulae (26) or (27). The resulting paper possesses a very high white content.

I claim:

1. Oxazole compounds of the formula

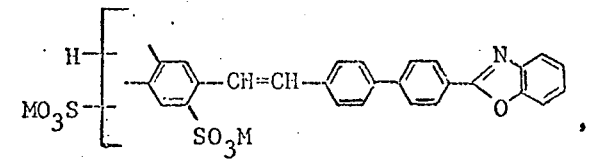

wherein M represents hydrogen or a salt-forming cation.

2. The oxazole compound according to claim 1, of the formula

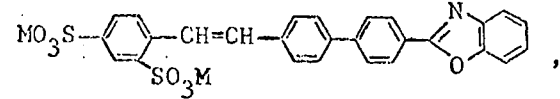

wherein M represents hydrogen or a salt-forming cation.

* * * * *